Aug. 25, 1970 D. WILLARD 3,525,480

MAGNETIC TAPE TRANSPORT

Filed May 29, 1967

INVENTOR.
DENNIS WILLARD,
By His Attorneys
Spensley & Horn

United States Patent Office 3,525,480
Patented Aug. 25, 1970

3,525,480

MAGNETIC TAPE TRANSPORT

Dennis Willard, 5937 W. 78th St., Los Angeles, Calif. 90045

Filed May 29, 1967, Ser. No. 645,848
Int. Cl. G11b *15/28, 15/56;* B65h *59/38*
U.S. Cl. 242—183 5 Claims

ABSTRACT OF THE DISCLOSURE

This invention relates to a web or tape transport system wherein a buffer means is provided that employs an expandable member which applies a controllable, substantially constant pressure under dynamic and static operating conditions to the tape to form a loop. The loop operates under substantially constant tension and provides a low inertia supply of tape.

BACKGROUND OF THE INVENTION

Field of the invention

It is necessary in many applications to drive a tape or web material in a controlled fashion through an arbitrary sequence of start, stop and reverse movements. In addition to precise start-stop characteristics, such systems usually maintain the speed of the tape or material at a selected relatively high velocity (e.g., 20–150 i.p.s. or more). A good example of systems requiring such characteristics is provided by magnetic tape transport mechanisms and particularly those used for digital applications. Such systems must cooperate on demand with data processing systems and must accordingly operate at high speeds but with precision in all respects. Such requirements are found in a number of other recording medium tape transport systems, however, in the invention it should be considered applicable to all systems for transporting a web of material.

Description of the prior art

In the high speed magnetic transport tape art slack loops are employed between the reels to enable quick starting, stopping and reversing of at least the portion of the tape in the vicinity of the heads. The massive reels which store the tape are not capable of being quickly started, stopped and reversed in comparison to a weightless segment or loop of tape at the heads which is moved directly by a capstan. In the systems which employ the slack loops the differentials of acceleration and the accelerations are absorbed by the loops. When the tape is started the takeup reel slack loop temporarily grows longer and the supply slack loop grows shorter, both loops being restored to normal length when the tape retains an operating velocity. In stopping, it is the takeup reel loop that grows shorter and the supply reel loop that grows longer. It should be understood that either reel may act as a supply or takeup reel.

In the prior art the slack loops have been formed by buffer means which fall into three categories; (1) mechanical buffers such as spring loaded arms, or arms operated by servomechanisms shown in U.S. Letters Patent No. 3,053,427; (2) vacuum column buffers such as U.S. Letters Patent No. 2,792,219, where a vacuum system pulls the tape into chambers thus maintaining a constant pressure and tension on the tape; and (3) a combination of categories (1) and (2) such as shown in U.S. Letters Patent No. 3,134,528. The pure mechanical buffer, while they are suitable for certain applications, do not provide a constant tension under all circumstances, impart substantial mass or inertia and friction and are relatively unreliable. The vacuum column type of buffer means while working well at a low altitude is impractical at high altitudes (e.g., over 15,000 feet) because of the enormous vacuum system that would be required to operate under such circumstances. Even at low altitudes the vacuum buffer requires substantial and relatively cumbersome pumping equipment.

SUMMARY OF THE INVENTION

The present invention provides a loop forming means with low mass, high reliability, and negligible pressure losses which is extremely compatible with high altitude operation. In addition, the invention system provides substantial weight, volume and cost reduction. Briefly, the invention comprises at least one means for dispensing web material; means coupling to said dispensing means for driving web material therefrom, and, a buffer means for forming a loop of the web material. The buffer means includes an expandable or extensible means for exerting a substantially constant pressure on said web material to form a loop, whereby a low inertia source of web material is provided which can be readily dispensed without need for excessive pumping equipment.

Specifically, the expandable means referred to above takes the form of a bellows or other expandable enclosure which provides a very low mass loop forming means and which does not require any substantial amount of air flow or vacuum. The reduction in the pumping requirement enables a considerable system simplification providing a most effective buffer means which is especially useful in airborne and high altitude applications. For example, the low pumping requirements enable one motor to be employed to drive the pump and to also drive both reels. In addition, the use of an expandable enclosure which employs a positive pressure operates most effectively at high altitudes. These and other advantages along with other novel structural aspects of the invented systems, will be readily understood by reference to the detailed description and drawings which follow.

DESCRIPTION OF THE PREFERRED EMBODIMENT

Figure 1:
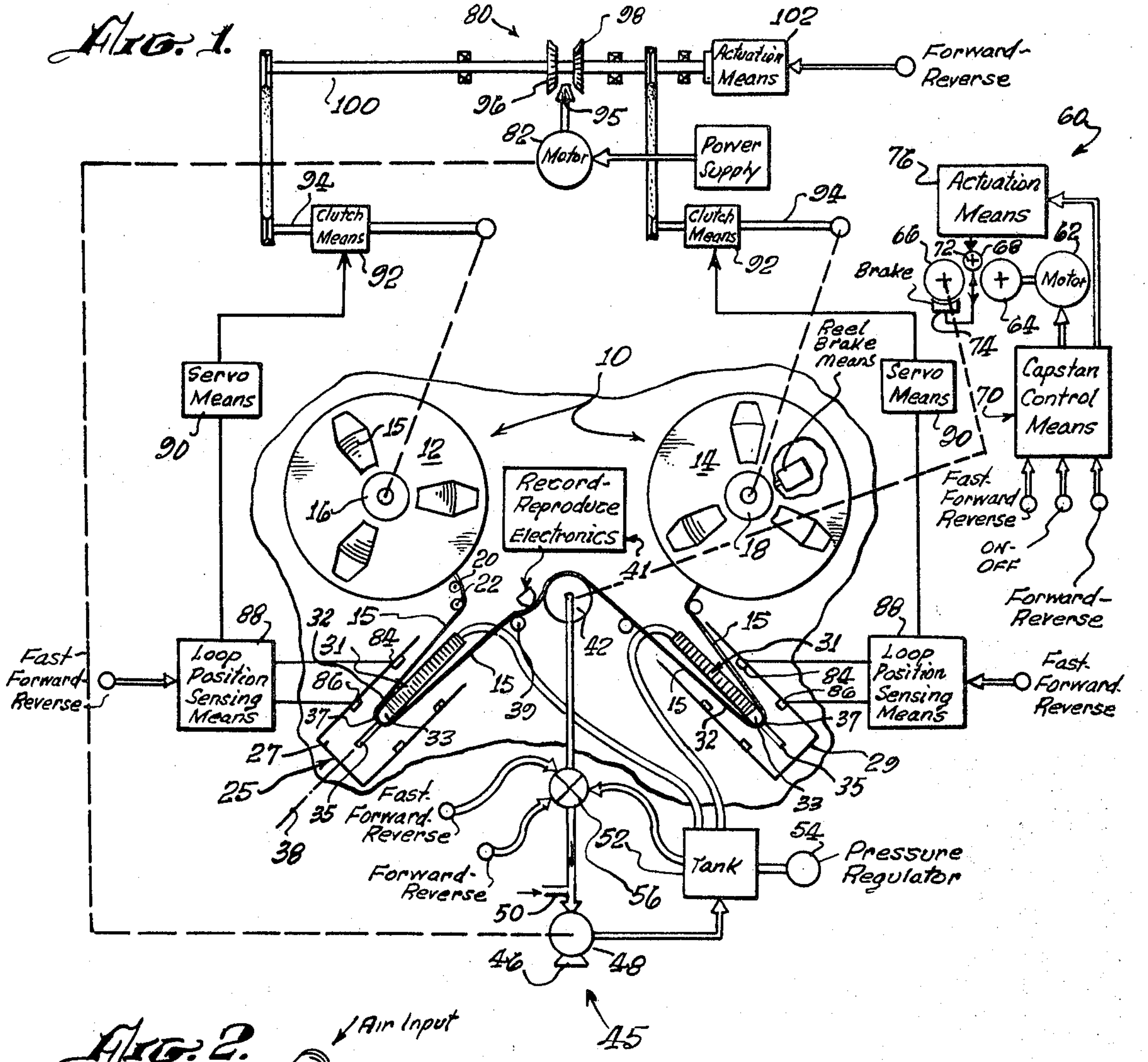
FIG. 1 is a diagrammatic representation of the system.

Referring to FIG. 1, the invented system includes a web material or tape dispensing means 10 which in the illustrated form is a pair of reels 12 and 14 having web material 15 in the form of a recording medium such as magnetic tape stored thereon. The reels 12 and 14 are mounted for rotation on shafts 16 and 18. These shafts are drivenly connected to means 80 for rotating reels 12 and 14. Means 80 will be described in detail later in the specification. In connection with reels 12 and 14 it should be understood, that it is within the scope of the invention to employ a single reel wherein the web material is in the form of a closed loop and the reel may take other than a conventional form, such as employed in a tape cartridge, for the purpose of illustration, the tape 15 will be considered to pass from reel 12 to reel 14. It is, of course, understood that the tape moves in both directions during normal operation depending upon the particular operational instruction received from some external source.

In this illustration the tape 15 passes from reel 12 over guides 20 and 22 into a buffer means 25 for forming a loop referred to as a slack loop. The buffer means 25 may include one or more units for forming a loop. There are many various configurations, arrangements and numbers of buffer loops employed in different designs such as shown in U.S. Letters Patent Nos. 3,185,364, 3,091,409, 3,057,568 and 3,091,408. At present, anywhere from 1 to 4 loops have been employed. The loops have various lengths ranging from what amounts to a very shallow loop in the neighborhood of several inches to lengths of several feet. The illustrated form of the invention is only one example of many to which this invention may be applied.

Figures 2, 3:
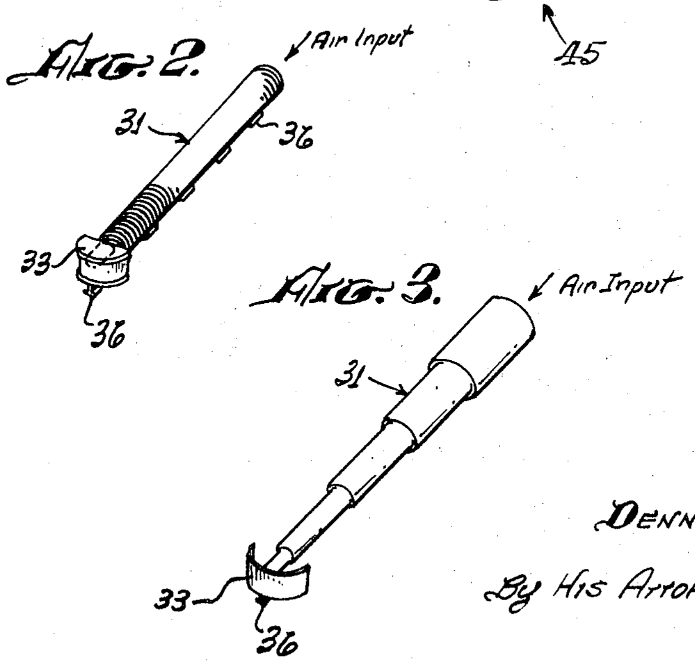
FIG. 2 is an enlarged view of one form of the expandable means.
FIG. 3 is an enlarged view of another embodiment of the expandable means.

In FIG. 1 there is shown a first buffer means 27 and second buffer means 29 which are substantially identical in construction. Thus, a description of first buffer means 27 will also describe second buffer means 29. First buffer means 27 is shown in detail in FIG. 2 and comprises an expandable means 31 having a tape support means 33 located at one end thereof and movably mounted in a slot 35. It is understood the expandable means 31 shall be a low mass structure, the mass being sufficiently low to provide a low inertia source of the tape medium. In one form the expandable means 31 is an expandable bellows (e.g., flexible hosing of rectangular or circular cross sections) connected to pressure source means 45 which is described in detail later in the specification. The bellows may be a plastic, or metal spring coil with a thin, flexible impervious sheet of plastic cloth, or rubber, having a low constant pressure applied thereto. In addition, guides 36 (FIG. 2) prevent buckling and facilitate axial movement of means 33. An alternative form of expandable means 31 is shown in FIG. 3 and is a telescoping tubing of thin plastic or metal, lapped to reduce leakage. Pressure source means 45 supplies a substantially constant pressure to expandable enclosure means 31 regardless of the extent of its expansion or compression. This enables the bellows 31 through tape support means 33 to exert a substantially constant pressure on tape 15 at the apex 37 of loop 32. The locating of tape support means 33 at the apex of loop 32 minimizes tape wear and facilitates the forming of the loop 32. The expandable means 31 has an axis 38 which is aligned in the same direction as the axis of loop 32 and is preferably coincident thereto. The tape support means 33 (FIGS. 2 and 3) is preferably made from a light weight self-lubricating plastic material such as Teflon, which may be hollowed to further reduce its weight.

In operation, as the reels start movement, the loop 32 will grow shorter and expandable means 31 will be compressed. During this compression expandable means 31 exert a substantially constant pressure on tape 15. When the reels stop, loop 32 will grow longer and expandable means 31 will be extended maintaining a substantially constant pressure on the tape of loop 32. The expandable means is guided by slot 35 in its compression and expansion.

In general the tape in a digital system is moved at a speed in the range of 20–150 i.p.s. and a tension of approximately under 16 ounces (preferably 8–12 oz. for digital tape recorder and 1 or 2 lbs, may be used for video recorders) is maintained on the tape by tape support means 33.

The tape 15 from buffer means 27 passes over guide 39 to a transducer or magnetic head 40 (which is connected to record-reproduce electronics 41) and then over a portion of means 60 for driving tape 15. The tape 15 is in direct contact with a capstan 42 when in a normal forward-reverse mode of operation or standby, mode, the tape is separated from the capstan by air cushion under fast forward or rewind condition. The capstan 42 is rotationally coupled to motor 62 via a first drive means 64, a second drive means 66 and an intermediate means 68. The motor 62 may be a low inertia armature motor 44 such as a DC type of motor having a planar rotor and windings in the form of printed circuit conductors. This type of motor is particularly useful for such applications because it not only has low armature inertia but also has a substantially linear torque vs. current characteristic over a relatively wide range. That is when coupled to a mechanical system involving low forces and inertia the application of a current may effectively control the operation of the mechanical system with relatively simple electronics. Systems such as this are known in the art such as described in U.S. Letters Patent No. 3,185,364 issued May 25, 1965.

Another particularly useful and preferred form of motor and control electronics employs a synchronous motor which may be operated at 400 cycles per second in a forward or reverse direction when supplied with a 400-cycle-per-second control signal by capstan control means 70. Control means 70 might include a tuning fork oscillator such as available from a Bulova Watch Company and marketed under the name of Accutron. The tuning fork oscillator is coupled to a power amplifier which in turn supplies a control signal to the motor 62 to drive it at a synchronous speed. Such a system has the advantage of being operated from DC without substantial modification. The Accutron oscillator or similar means is not necessary when a 400-cycle power source is available.

The rotational output from motor 62 which is coupled to first drive means 64 is selectively coupled to second drive means 66 by intermediate means 68. The intermediate means 68 includes an idler pinion 72 and a brake means 74 which are operated by actuation means 76. Actuation means 76 may take the form of a solenoid energized capstan control means 70 to assume at least two positions. In a first position brake means 74 engages second drive means 66 which is attached to, or which is coupled to, a pinion attached to the capstan 42. Thus, brake means 74 holds the capstan in a fixed position when the intermediate means 68 is in one position. In a second position the brake means 74 is disengaged from second drive means 66 and idler pinion 72 engages first drive means 64 and second drive means 66. This couples the rotation from motor 62 therethrough and to drive capstan 42 in a predetermined direction depending on the signal supplied by capstan control means 70. Where a synchronous motor is employed the capstan 42 is driven at a constant speed. It is, of course, within the scope of the invention to use various of servo means as part of the capstan means to drive the capstan at a constant or other means.

In the preferred embodiment of the invention capstan 42 includes a plurality of holes on its surface which in turn is coupled to pressure source means 45. A positive pressure or vacuum is selectively supplied to capstan 42 by pressure source means 45. This pressure is applied to the capstan holes only over the area thereof which contacts tape 15 or a lesser area. This may readily be accomplished by providing the capstan 42 with proper manifolding means within the capstan.

In operation of means 60, a control signal is applied to capstan control means 70 by an external source such as a computer or push button control means. The signal applied to control means 70 takes the form of a fast-forward or fast-reverse signal, an on-off signal or a forward-reverse signal. The capstan control means 70 in turn provides appropriate signal to motor 62, and substantially simultaneously provides a signal-to-actuation means 76, and actuation means 76 operates intermediate means 68 to rotationally couple first drive means 64 to second drive means 66 which in turn rotates capstan 42. When an off signal is received, intermediate means 68 is moved to such a position that idler pinion 72 disengages first and second drive means 64 and 66 and substantially simultaneously brake means 74 engages second drive means 66 stopping capstan 42 and in this manner capstan 42 is driven at a substantially constant speed and is readily stopped.

The pressure source means 45 includes a pump or pressure source means 46 which is driven by a motor 82 which is also employed for driving reels 12 and 14. The same motor 82 may be used for both functions (pump drive and reel drive) because of the low horse power requirement of pump 46. For example, less than 0.1 HP may be employed to drive pump 46. This is because of the low air loss in connection with buffer means 25.

The pump 46 has the characteristic of providing a positive pressure (e.g., ½ p.s.i. above environmental pressure) at pump outlet 48 and providing a vacuum at pump inlet 50. The positive pressure is coupled to a tank or similar means 52 which serves to provide expandable means 31 with a constant pressure fluid. The tank 52 has a volume which is substantially greater (e.g., more than twice) than the total volume of the expandable means employed in buffer means 25. This results in the changes in volume of the expandable means 31 being relatively insignificant and resulting in little, if any, pressure change within bellows 31. The tank 52 has a pressure regulator 54 which, in any event, maintains the pressure within tank 52 at a substantially constant value. There is a pressure transducer on the tank to shift off the system if the pressure drops below a preselected value. The output of tank 52 is preferably independently coupled to buffers 27 and 29. This tends to eliminate pneumatic oscillations.

The output of tank 52 is connected to a two-way valve means 56 which, in addition, has one of its inputs connected to the inlet of pump 46. Thus, valve means 56 which is coupled to capstan 42, may supply a vacuum or positive pressure thereto. Valve means 56 is controlled by the supplying of a signal to the fast forward-rewind terminal or the forward-reverse terminal. When the appropriate signal is applied to the forward-reverse terminal, valve means 56 will connect the pump inlet and consequently a vacuum to capstan 42. The application of a vacuum to capstan 42 facilitates the gripping of the tape in a positive fashion without necessitating a pinch roller or other mechanical means. The vacuum also provides a positive holding and positioning of the tape when the tape is not moving which increases reliability. It is noted that any slippage in the tape may cause error in the transfer of data therefrom. The application of a signal to the fast forward-reverse terminal will cause valve means 56 to couple the positive pressure of tank 52 to capstan 42. The positive pressure of the capstan 42 provides an air bearing during the fast-forward or fast-rewind operation which in turn minimizes the wear experienced by the tape during these modes of operation. Thus, a capstan is provided which has both positive gripping action during certain modes of operation an an air bearing during other modes of operation.

The motor 82 which drives pump 48 also forms part of means 80 for rotating reels 12 and 14. Means 80 includes two substantially identical driving arrangements which are operated by motor 82. Thus, an explanation of the driving arrangement associated with reel 12 will make clear the operation of the driving arrangement associated with reel 14. Located adjacent expandable means 31 and spaced therefrom is short loop sensing means 84 and long loop sensing means 86. Loop position sensing means 88 has a fast-forward-reverse terminal connected thereto so that when an appropriate signal is supplied thereto, the reels will be operated in a fast mode. This is a well known technique. Means 84 and 86 may each comprise a light source and photocell which provides signals to loop position sensing means 88 which in turn is connected to servo means 90 (such as a bang-bang servo). The output of servo means 90 is in turn coupled to clutch means 92 so that motor 82 rotates the output shaft 94 of clutch means 92 connected to reel 12 at various speeds depending upon the control signal supplied by servo means 90.

In operation, assuming the reels to rotate as indicated in FIG. 1, photocells 84 and 86 provide a signal to loop position sensing means 88 which in turn provides an error signal to servo means 90. The error signal is such that when the loop extends beyond photocell 86 the servo means will tend to de-clutch or reduce the coupling between its various parts of the clutch. This in turn decelerates or reduces the speed of output shaft 94 and reel 12 and consequently results in a shortening of the loop 32. Conversely, when the loop is shortened so that light passes from the light sources to both of the photocells, then an error signal will be provided by the loop position sensing means 88 to servo means 90 which will increase the coupling between the parts of clutch means 92 and thereby accelerate and increase the speed of shaft 94. It should be understood that with the reels rotating in the reverse direction the reel 14 functions as reel 12 and reel 12 functions as reel 14 with respect to the description above. When fast-forward-reverse is initiated, the reels are controlled primarily by the signal supplied to the fast-forward-reverse terminal and the reels rather than the capstan move the tape.

In accordance with the invention, it should be understood that any of a number of different forms of loop position sensing means may be employed such as limit switches operated by the expandable means 31 or reel switches operated by magnetic inserts on the bellows or other position sensing means of a pneumatic electrostatic, magnetic capacitive type. Similarly, many different types of servomotor control means may be employed. It is preferred that the servo means 90 be compatible with an eddy current or hysteresis type of clutch means which clutch means is well known in the art. Such clutch means are in general controlled by increasing the magnitude or frequency of the current supplied to the eddy current or hysteresis clutch.

It should be noted that buffer means 29 has substantially the identical components, that is, loop sensing means, servo means and clutch means, for driving reel 14. This enables reels 12 and 14 to be independently controlled notwithstanding they are driven by a common motor 82. For this purpose motor 82 is connected to a driving arrangement which includes a cone drive having a driving member 95 connected to motor 82 and a pair of driven members 96 and 98 mounted on shaft 100. Shaft 100 is axially movable and is actuated for axial movement by actuation means 102 which may take the form of any known linear actuator such as a solenoid. The energization of actuation means 102 by this application of an appropriate signal to the forward-reverse terminal connected to actuation means 102 will move the shaft 100 so that driving member 94 engages either driven member 96 or driven member 98 to drive shaft 100 in a first (e.g., forward) or second (e.g., reverse) direction. The rotation of shaft 100 is in turn coupled to the two separate clutch means associated with the reels 12 and 14. The driving arrangement between the conical drive means and the clutch means is shown as a pulley belt arrangement, however, it may take the form of any well known driving arrangement. (One such driving arrangement is shown in U.S. Pat. No. 3,057,568 issued on Oct. 9, 1962.) Also included as part of the means for rotating reels 12 and 14 are appropriate brake means, which are well known in the art, and operated to stop reels 12 and 14.

In operation, means 80 for rotating reels 12 and 14 perform the following manner. The shaft 100 is moved from a neutral position to a first or second position by actuating means 102 whereby motor 94 has its rotational output transmitted in a clockwise or counterclockwise direction to clutch means 92 and to the clutch means associated with reel 14. The speed of rotation of the reels 12 and 14 are in turn controlled by the loop position sensing means and servo means which controls the degree of coupling between the parts of the clutch. Thus, reels 12 and 14 both rotate in the same direction which direction is controlled by the position or shaft 100. The speed of the reels is independently controlled by the separate servos and associated devices. The capability of driving both reels by a single motor results in substantial cost saving, weight reduction and volume reduction. It is made possible by recognition of the fact that the reels 12 and 14 both move in the same direction at any given time.

With the subsystem and the cooperation therebetween described in detail, the operation of the overall system may now be summarily considered. Means 80 rotates the reels 12 and 14 via motor 82 and the clutch means associated therewith. The reels 12 and 14 rotate in the same direction but at different speeds as determined by the position of the apex 37 of the tape loops formed in buffer means 27 and 29 via expadable means 31 associated therewith. Considering the reels to be rotating as indicated on the drawing as a tape loop in buffer means 27 goes beyond the photocell 86, the speed of the reel 12 is reduced. When the apex 37 of the tape loop withdraws beyond photocell 84, reel 12 is driven at a higher speed. The reel 14 operates in a substantially reversed fashion. That is, when the tape loop gets too long, the speed of the reel is increased and when the tape loop becomes too short, the speed of the reel is decreased. The tape is driven from buffer means 27 to buffer means 29 by the capstan means 60 which includes capstan 42 in direct contact with the tape. The capstan 42 grips the tape by means of application of the vacuum from pressure force means 45. When the tape is driven in a normal forward or reverse manner. When a fast reverse or forward is instigated, a positive pressure is applied to capstan 42 which provides an air bearing. The pressure source means 45 in addition to supplying a vacuum or positive pressure to capstan supplies a positive pressure to the expandable means 31 via tank 52 so that a constant tension is always exerted upon the tape. The expandable means is of very low mass and has very little pressure loss which characteristics facilitate the forming of tape loops in a most effective manner with considerable efficiency. This type of expandable means is readily operated at sea level as well as altitudes in excess of 70,000 sq. ft. This functional operation is accomplished with a minimum of complexity, weight and volume reduction and considerable cost saving. It is estimated that in comparison with vacuum buffer systems the power required for the pumping is less than ⅕ of that normally required at one atmosphere and much smaller ratios at significantly less than one atmosphere.

Although this invention has been disclosed and illustrated with reference to particular applications, the principles involved are susceptible of numerous other applications which will be apparent to persons skilled in the art.

What is claimed is:

1. A recording system for recording on a tape medium comprising:
- a first reel mounted for rotation;
- a second reel mounted for rotation;
- a first clutch means drivenly connected to said first reel and controllable to drive said first reel at various speeds;
- a second clutch means coupled to said second reel drivenly connected to said second reel and controllable to drive said second reel at various speeds;
- a first motor for providing a rotational output;
- a bidirectional drive means coupled to both first clutch means and said second clutch means and to said motor for transmitting the rotational output of said motor to said first and second clutch means, said bidirectional drive means having at least a first position and a second position, said first position for driving said first and said second clutch means in a first direction, and a second position for driving said first and second clutch means in a second and opposite direction;

- actuation means for positioning said bidirectional drive means in at least said first or second position;
- a first buffer means to form a loop of said tape medium, said first buffer in cooperative relationship with said second reel;
- said first buffer means and said second buffer means including an expandable means for exerting a substantially constant tension in said tape medium to form a loop;
- at least one capstan means for moving said tape medium over a recording device; and,
- pressure source means coupled to said expandable means for supplying a fluid at a substantially constant pressure to said expandable means.

2. The structure recited in claim 1 wherein said capstan means is a single capstan located intermediate said buffer means;
- said pressure source means provides both a fluid under pressure and a vacuum; and
- valve means coupled to said pressure source means and said capstan for selectively providing said capstan with a vacuum or a fluid under pressure, whereby said capstan is selectively provided with an air bearing or with a vacuum.

3. The structure recited in claim 1 wherein said first motor means is coupled to said pressure source means to drive said pressure source means.

4. The structure recited in claim 1 wherein said first and second clutch means are each controlled by an electric signal which controls the degree of coupling between the parts of said clutch means.

5. The structure recited in claim 1 wherein said capstan means comprises a capstan;
- a motor means providing a rotational output;
- a capstan control means for controlling the speed of rotation of said motor means;
- a first drive means coupled to said motor for transmitting the rotation of said motor, second drive means coupled to said capstan;
- intermediate means intermediate with said first drive means and said second drive means and having a first position for coupling the rotation of said first drive means to said second drive means and having a second position for braking said second drive means and disengaging said first drive means from a driving relationship with said second drive means; and,
- actuation means for operating said intermediate means from at least a first position to a second position and visa versa.

References Cited

UNITED STATES PATENTS

| | | | |
|---|---|---|---|
| 1,998,453 | 4/1935 | Foster et al. | 242—75.3 X |
| 2,069,595 | 2/1937 | Thomas. | |
| 2,569,264 | 9/1951 | Stone et al. | 242—75.3 |
| 2,954,911 | 10/1960 | Baumeister et al. | |
| 3,106,355 | 10/1963 | Warren | 226—97 X |
| 3,156,423 | 10/1964 | Potter et al. | |
| 3,164,333 | 1/1965 | Robertson. | |
| 3,251,563 | 5/1966 | Kleist et al. | 226—188 X |
| 3,254,855 | 6/1966 | Rayfield. | |
| 3,317,156 | 5/1967 | Hank | 242—75.3 |
| 3,322,315 | 5/1967 | Eberlin | 226—195 |

GEORGE F. MAUTZ, Primary Examiner

U.S. Cl. X.R.

226—95, 118, 188, 195; 242—75.3, 190, 202, 207